(12) United States Patent
Sternowski (10) Patent No.: US 11,177,651 B1
(45) Date of Patent: Nov. 16, 2021

(54) WAVEFORM LIMITER CIRCUIT (71) Applicant: Softronics, Ltd., Marion, IA (US)

(72) Inventor: Robert H. Sternowski, Cedar Rapids, IA (US)

(73) Assignee: SOFTRONICS, LTD., Marion, IA (US)

( * ) Notice: Subject to any disclaimer, the term of this patent is extended or adjusted under 35 U.S.C. 154(b) by 0 days.

(21) Appl. No.: 17/325,008

(22) Filed: May 19, 2021

Related U.S. Application Data (60) Provisional application No. 63/162,253, filed on Mar. 17, 2021.

(51) Int. Cl.
*H02H 9/04* (2006.01)
(52) U.S. Cl.
CPC ........................ *H02H 9/04* (2013.01)
(58) Field of Classification Search
CPC ........................................................ H02H 9/04
USPC ............................................................ 361/86
See application file for complete search history.

(56) References Cited

U.S. PATENT DOCUMENTS

| | | | | |
|---|---|---|---|---|
| 3,207,952 A | * | 9/1965 | Brahm | H04N 5/265 361/91.5 |
| 4,053,875 A | * | 10/1977 | Kupersmit | G01R 19/145 324/72 |
| 2014/0104738 A1 | * | 4/2014 | Schweitzer, III | H02H 3/08 361/87 |
| 2016/0079812 A1 | * | 3/2016 | Sakai | H02J 50/05 307/104 |
| 2016/0181790 A1 | * | 6/2016 | Thompson | G01R 31/34 361/20 |

* cited by examiner

*Primary Examiner* — Dharti H Patel
(74) *Attorney, Agent, or Firm* — Shuttleworth & Ingersoll, PLC; Jason R Sytsma (57) ABSTRACT

A limiter comprising of a step-up circuit with an input node and an output node for electrically stepping up an output signal at the output node from an input signal at the input node. A threshold switch circuit is connected to the step-up circuit for limiting peak voltages of the output signal from the step-up circuit.

20 Claims, 7 Drawing Sheets

WAVEFORM LIMITER CIRCUIT

CROSS-REFERENCE TO RELATED APPLICATION

The present application claims the benefit of U.S. Provisional Application Ser. No. 63/162,253 filed Mar. 17, 2021, which is incorporated herein by reference.

TECHNICAL FIELD

This disclosure relates to electronic circuitry, and more specifically, this disclosure relates to a broadband waveform limiter.

BACKGROUND INFORMATION

Limiters have wide application in modern electronic circuits. They are used to limit power, voltage, or current to protect electrically connected downstream electronic devices from being damaged by excessive power, voltage, or current from a source, which may be an upstream power source, signal source, antenna, device being tested, etc.

Limiters can be used in radios, such as receivers, transmitters, transceivers and their individual components. Take for example, an amplifier, where the purpose is to increase the power level of an input driving signal to a designed output power level. The driving signal can be virtually any time-amplitude varying signal, such as voice, music, digital data, motor control signals, radio signals with or without modulation(s), single or multiple driving signals, to name but a few examples. Of particular concern to this disclosure are amplifiers designed to linearly amplify a driving signal where the output of the amplifier is a precise higher power replica of the input signal.

Linear amplifiers are critically important for audio signals, and especially to modern data signals used in radio communications. Both audio and radio applications find their most severe operating conditions in the presence of multiple independent and simultaneous driving signals. In this case, the amplifier must output a replica of the vector voltage sum of all driving signals. By Ohm's law, the peak power of N independent driving signals of equal power will be equal to $N^2$ times the average power of any one signal. This is commonly referred to as the Peak to Average Power Ratio ("PAPR"). The PAPR and hence peak power increases exponentially with the number of individual signals.

For a truly linear amplifier design, the amplifier must have sufficient dynamic range, often referred to as "head room", to accommodate the vector sum voltage and current swing of the waveform at the amplifier output. The actual average power at the amplifier output is generally low under these circumstances. Thus the amplifier must handle the high peak voltage linearly, but need only be able to source and dissipate power commensurate with the total average power. The dilemma that results is having an input drive signal that inadvertently exceeds the allowable peak vector power to an extent that damages the amplifier, the feedline, and/or the antenna of a radio system. In an audio system, a similar occurrence will potentially damage the amplifier and speakers.

Prior art has traditionally used an automatic gain control (AGC) circuit or a "hard" limiting circuit to prevent amplifier damage by limiting the input driving signal. The AGC method uses a feedback loop with an electronic attenuator and finite time constant (loop bandwidth) to reduce the input drive to the amplifier to prevent damage. The hard limiter is a circuit that very rapidly (limited by component physics) reduces its impedance as applied voltage rises, and hence as part of a voltage divider rapidly reduces input drive power to prevent damage from vector peak voltages. Note that the key distinctions between these two methods lie in two important areas. First, with respect to time constant, the AGC method has a feedback loop bandwidth that limits how fast it can respond. The output signal must first exceed the reduction threshold before power reduction begins a finite time interval later. Second, with respect to linearity, the AGC method reduces the input drive signal in order to maintain the amplifier output power within a safe tolerance. This can generally be done in a linear manner, although that may or not be a design requirement. The hard limiter simply clips the portion of the waveform that exceeds the safe voltage threshold without regard to spectral distortion products that are generated by the limiting process.

Given that virtually all modern amplifiers utilize transistors, fabricated from a variety of semiconductor materials, it is well known that damaging a semiconductor junction from high voltage or high current requires only 10-100 nanoseconds, thus the time response of a power limiter becomes very important. As radio communication data signals have increased in speed and number of independent in-band signals, and thus bandwidth, the PAPR has risen significantly, and the vector peaks have gotten shorter with increased bandwidth. With a 10-100 nanosecond damage window, the AGC loop bandwidth nears microwave frequencies and becomes increasingly impractical.

The alternative is to utilize a hard limiter, with the system engineering realization that the limiter must be active only if the input drive signal is above its specified range. If this is the case, then any nonlinearities and resulting spectral artifacts generated by the clipping of the hard limiter are an unavoidable result of failure to control the drive signal, but will last only for the time duration of the vector peak's voltage excursion above the limiter threshold. The response time of the hard limiter is a component physics limitation, and generally far less than the vector peak duration.

The significance of spectral artifacts generated by the nonlinearities of an amplifier and/or limiter is twofold. First, if the spectral artifacts fall in-band with the transmitted signal, then they are mixed with and transmitted as interference in the in-band signal and degrade the Bit Error Rate (BER) of the data signal by increasing the interfering noise floor of the transmitted signal. In audio systems, this sounds like an unrealistic, fuzzy sounding sound representation. Second, if the spectral artifacts fall out-of-band relative to the passband of the transmitted signal, they run the risk of violating regulatory constraints which are design to avoid interference to spectrum users operating on adjacent frequencies. The distortion-produced artifacts appear as interference in adjacent unrelated channels, which causes interference to those licensed users. There is no equivalent effect of audio out-of-band artifacts.

The actual distortion producing mechanism can be found in numerous communication theory textbooks, and is based on applying the Power Series expansion to distorted sinewave signals, then converting the results to the frequency domain to see the products. In summary, distortion in an amplifier and/or limiter will generate 1) harmonic frequencies at integer multiples of each of the individual input signal frequencies, and also 2) intermodulation distortion products, which are the sum and difference artifacts of each combination of harmonic artifacts generated by the harmonics being applied to the circuit non-linearities (which then act like a diode mixer).

In a pure, undistorted sinewave at a given frequency Fs, for example, there are no harmonics. As the sinewave is gradually distorted by clipping, odd harmonics of Fs are generated. If the sinewave is severely clipped to the point of approximating a square wave, the spectral content becomes an infinite spectrum of high level odd harmonics of Fs. The time duration of each interfering artifact equals the duration of the vector peak time exceeding a distortion threshold. Such artifacts are often referred to as Transient Intermodulation Distortion (TIM) products.

Prior art in hard limiters most often uses diodes of some type shunting a signal circuit carrying the signal to be limited. The semiconductor junction forward voltage V-I characteristic is generally used for the limiting threshold, literally adding a sufficient number of diodes in series so that the limiting threshold equals the desired peak voltage limiting threshold. This solution is equally applicable to all types and uses of amplifiers where peak limiting is required. Because audio and radio signals are sinewaves with equal positive and negative voltage swings over the signal periods, the limiter must be bidirectional, such that positive and negative signals are equally limited to prevent amplifier damage from either.

Zener diodes are often used for higher voltage limiting applications, frequently several in series, and with two such opposed polarity sets in series to achieve the needed bidirectionality. For microvolt-level receive signals, one to three simple signal diode junctions in series (0.6 volt nominal forward voltage per junction) are sufficient.

The operation of a conventional threshold switch implemented as a diode limiter is well known. With an ideal diode, zero current flows through the diode until the forward voltage is reached (nominally 0.6 volt for a silicon junction), and the diode appears to the circuit as an infinite high impedance. When the 0.6 volt threshold is exceeded, the ideal zero impedance of the diode allows infinite current to flow through it, and the diode appears to the circuit as a short circuit less a volt series drop of 0.6 v. If a reverse voltage is applied to the diode, zero current flows and the diode appears to the circuit as an infinite high impedance.

A Zener diode operates similarly, but the diodes are applied in series opposition rather than in parallel for the needed bi-directional operation. A Zener diode has forward voltage characteristic identical to a conventional diode junction, but has a reverse voltage characteristic that is ideally an infinite impedance (zero current) until the Zener voltage of the device is exceeded, when the reverse current flow becomes infinite and the ideal resistance zero. Putting two Zener diodes in series opposition effectively sums the forward voltage of the second diode with the Zener threshold of the first diode. Commonly used bidirectional "TVS" transient suppression diodes are simply two identical Zener diodes in series opposition in a single package.

The V-I characteristic of a real diode can be described in three regions of operation. First, a small essentially constant leakage in the reverse direction; second, an exponentially increasing amount of current flow as voltage rises to the junction forward voltage; and third an increasing current above the junction forward voltage, limited by the bulk resistance of the diode die. In engineering parlance, this second and third region of operation is often referred to as the "soft knee" of a diode V-I response. As the voltage of the applied sinewave is increased, the tip of the sinewave output is flattened slightly. As the sinewave tip is compressed, the harmonic levels and the generated intermodulation artifacts increase. The limit case is where the applied sinewave is much greater than the limiting threshold, and the resulting residual limited waveform is a simple square wave rich in odd harmonics out to infinite frequency. Zener and TVS diodes have similar soft-knee characteristics, and hence have the same distortion generating properties when used in limiter applications.

It is the objective of this invention to disclose a device and method of overcoming the shortcomings of prior art, and minimizing the non-linear spectral artifact generating characteristics of a threshold switch for downstream components.

SUMMARY

Disclosed a method of protecting a receiver from an input signal from a source exceeding a damage threshold voltage for the receiver. The method described herein comprises of increasing with a step-up circuit comprising an input node and an output node the input signal received at the input node of the step-up and limiting peak voltages of the input signal from the output node of the step-up circuit using a threshold switch circuit connected to the step-up circuit.

In an embodiment, the method comprises of extending a linear range of operation of the threshold switch circuit by stepping up a voltage of the input signal from the source with the step-up circuit and dissipating excess energy from signals that exceed a threshold level with the threshold switch circuit. Stepping up the voltage of the input signal from the source with the step-up circuit can be done with a passive or active step-up circuit. One of the key advantages is limiting the input signal from the source. This can be done using a pair of cooperating, reverse polarity passive switches for the limiting peak voltages of a positive and a negative half-cycle of the input signal.

In an embodiment, a limiter is provided comprising of a step-up circuit with an input node and an output node for electrically stepping up an output signal at the output node from an input signal at the input node. A threshold switch circuit is connected to the step-up circuit for limiting peak voltages of the output signal from the step-up circuit.

In some embodiments, the step-up circuit comprises of a first transformer that steps up the voltage of the output signal from the input signal at the input node of the transformer. The first transformer can comprise of a step-up transformer with a 1:N turn ratio for stepping up a voltage of the output signal with respect to the input signal an amount sufficient to increase a linear operating range of the threshold switch circuit. The first transformer can be a step-up transformer with a 1:N turn ratio for stepping up a voltage of the output signal with respect to the input signal an amount sufficient to increase a linear operating range of the threshold switch circuit applied to the output of the first transformer.

A second transformer can be connected to an output node of the threshold switch circuit to step down the voltage. The second transformer can be a step-down transformer with a N:1 turn ratio for stepping down the limited voltage of the output signal with respect to the input signal to maintain an impedance match to the receiving device.

In an embodiment, the threshold switch circuit can comprise of a pair of cooperating, reverse polarity passive shunt switches for the limiting peak voltages of a positive and a negative cycle of the output signal from the step-up circuit. The pair of cooperating, reverse polarity passive switches can comprise of a pair of Zener diodes series-connected in reverse polarity for the limiting peak voltages of a positive and a negative cycle of the output signal from the step-up circuit. Each Zener diode of the pair of Zener diodes can further comprise of at least two Zener series-connected Zener diodes to increase a threshold voltage of the pair of Zener diodes. The pair of Zener diodes can be connected in shunt across an output node of the step-up circuit. The pair of Zener diodes can also be connected in shunt across the output node of the first transformer.

In an embodiment, a second transformer with the pair of Zener diodes connected in shunt across a primary winding of the second transformer and a load connected to a secondary winding of the second transformer can be provided. The load can be any passive or active electrical device or circuit that needs protection from an excessive input signal. Such devices, include, but are not limited to, amplifiers, mixers, synthesizers, RF receivers, transmitters, or transceivers.

The first transformer can be a step-up transformer with a 1:N turn ratio for stepping up a voltage of the output signal with respect to the input signal an amount sufficient to increase a linear operating range of the pair of Zener diodes and the second transformer can be a step-down transformer with a N:1 turn ratio for stepping down the voltage of the output signal with respect to the input signal to maintain an impedance match to the receiving device. The first transformer can further comprise of a first secondary winding and a second secondary winding, wherein the load is connected across the first secondary winding and the pair of Zener diodes are connected in shunt across the second secondary winding of the first transformer. The threshold switch can comprise of a transistor that is switched from a high impedance mode to a low impedance mode when a signal applied the transistor exceeds a threshold value. The step-up circuit and the threshold switch circuit can be passive devices or active devices.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
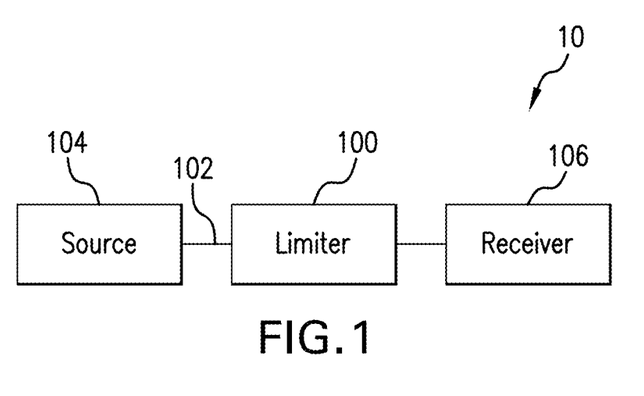
FIG. 1 is a circuit diagram of a generalized embodiment of a limiter according to this disclosure implemented in an RF receiver.
Figure 2:
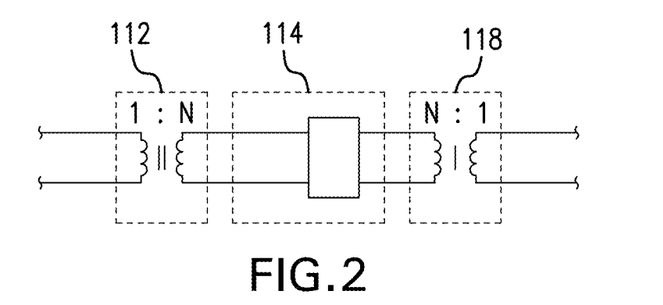
FIG. 2 is a circuit diagram of the limiter of FIG. 1.

FIG. 1 is a circuit diagram of a generalized radio 10 including a limiter 100 in accordance with this disclosure. Limiter 100 can be a passive device meaning that it is incapable of controlling current by means of another electrical signal. In other words, the output of passive limiter 100 can be based strictly and entirely on its input. Such a configuration would give limiter 100 a faster response time than an active limiter. Limiter 100, however, can also be active device with an output controlled by a reference signal.

Limiter 100 is shown electrically coupled to a signal line 102 from a source 104 to a receiver 106 (where "receiver" includes any electrical circuitry for which voltage limiting protection is desirable, including but not limited to amplifiers). In this particular example, limiter 100 is positioned in series between the upstream source 104 and downstream receiver 106. Limiter 100 comprises of a step-up circuit 112 and a threshold switch circuit 114. The linear driving signal from source 104 is received at the input ports of step-up circuit 112 and transferred to the output ports of step-up circuit 112. Step-up circuit 112 raises the threshold (current or voltage) of the threshold switch circuit 114. Since the linear range is the operating range from 0 to the threshold, step-up circuit 112 essentially increases the linear range of threshold switch circuit 114. Step-up circuit 112 can also physically and electrically isolate the incoming signal at source 104 from the output ports of step-up circuit 112.

Step-up circuit 112 can be any circuit element that steps up a signal (voltage or current) between the input ports and the output ports. Such step-up circuits, include, but are not limited to, transformers and reactive or inductive circuits with a combination of inductors (L), capacitors (C) and resistors (R). In an embodiment, step-up circuit 112 is a transformer 12a with 1:N windings to step up the amplitude of the incoming signal from source 104 where "N" is a design specification based on the maximum voltage input for receiver 106. Transformer 12a can be a transformer that receives from source 104 an RF signal at its primary windings which generates a magnetic field and induces a voltage across its secondary windings and causes current to flow across the load. Preferably, transformer 12a has its impedance matched with source 104 for maximum power transfer and minimal signal reflection.

Step-up circuit 112 is connected to threshold switch circuit 114. The signal from source 104 is provided as stepped-up input to threshold switch circuit 114. Threshold switch circuit 114 has a linear range of operation with a high impedance below a signal threshold. Above a signal threshold, the threshold switch circuit 114 may be linear but has a 0 (or near zero relative to the other state) impedance. Threshold switch circuit 114 has a leakage region of operation where an input to threshold switch circuit 114 is provided at its output less the small voltage drop across its circuit elements. During this range of operation an increasing ± voltage provides only a small essentially constant leakage current. When the threshold switch circuit 114 switches into the ON state, the stepped up voltage from the secondary winding of transformer 12a will appear to have a shorted secondary winding, so all of the driving energy is dissipated in the shorted winding. This way receiver 106 connected to the secondary winding of transformer 12a is starved of any induced signal, thus protecting receiver 106 from voltage spikes.

Figure 5:
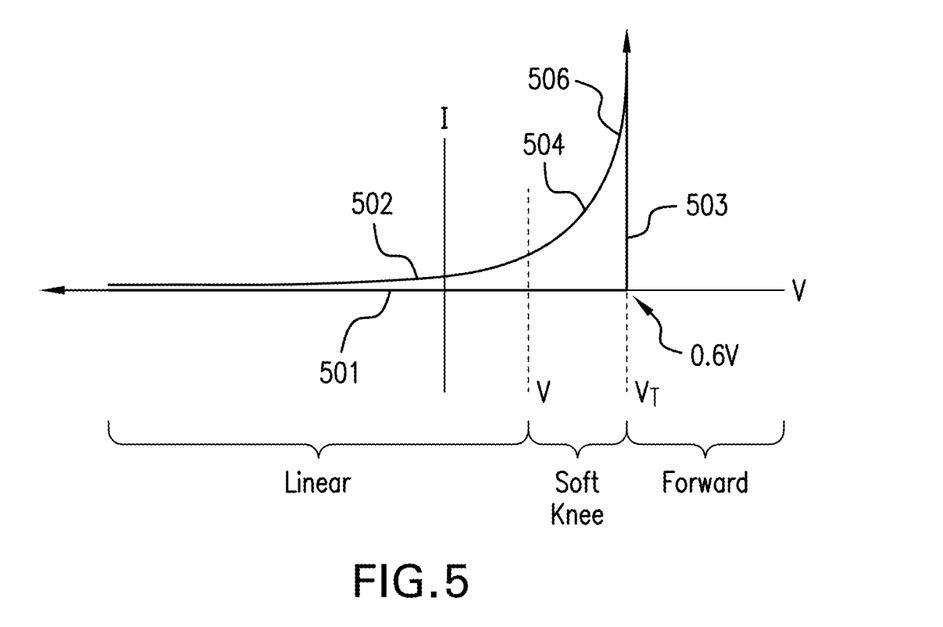
FIG. 5 shows an IV curve of a real diode and an ideal diode with its regions of operation.

FIG. 5 shows an IV graph of a real diode overlaid with the IV graph an ideal diode. The ideal diode has two regions of operation: (1) a linear region 501 where an increasing ± voltage provides zero (0) current so that the diode appear to the circuit as an infinitely high impedance; and (2) an infinite current region 503 at the threshold voltage so that the diode appears to the circuit as zero (0) impedance. In practice, however, a real diode has three regions of operation: (1) a linear region 502 where an increasing ± voltage provides only a small essentially constant leakage current; (2) a soft-knee region 504 where current increases exponentially as voltage rises; and (3) an increasing current region 506 above the junction forward voltage limited by the bulk resistance of the diode die. Threshold switch circuit 114 is preferably configured to operate in the first, linear region of operation. In this linear region of operation, preferably the input voltage (or current) is equal to the output voltage (or current). A positive or a negative gain can also be provided. As the voltage of the applied signal from source 104 increases, or as may be increased by step-up circuit 112, threshold switch circuit exceeds its linear region of operation and begins to operate in the soft-knee region of operation where it is non-linear spectral artifacts are generated.

Threshold switch circuit 114 can be configured as any device that switches from high impedance to zero impedance (or near zero relative to the high impedance state) at a signal threshold. Such devices comprise unipolar or bipolar devices, or a pair of unipolar devices acting in concert. Such devices can include relays, either open or closed or bipolar where the relay does not change stage (e.g. normally open to closed or vice versa) until the threshold of the coil voltage closure is exceeded. Devices further include any combination of passive diodes or Zener diodes connected in series (forward or reverse connected), parallel or antiparallel, or shunt across the load depending on the design characteristics.

In an embodiment, where source 104 is an AC signal source with positive and negative oscillations, a combination of reverse-connected devices should be included. One combination can use two diodes connected anti-parallel and shut connected across the load. A positive DC bias voltage can be connected to the anode of a first diode and a negative DC bias voltage can be connected to the cathode of a second diode of the two diodes connected anti-parallel so that the circuit limits the waveform from source 104 above the sum of the DC source plus the Vthreshold of the first diode and below the sum of the DC source plus the Vthreshold of the second diode. One skilled in the art will recognize that a plurality of series-connected diodes can comprise first diode with Vthreshold being summed and a plurality of series-connected diodes can comprise second diodes can comprise second diode with Vthreshold being summed.

Figure 3:
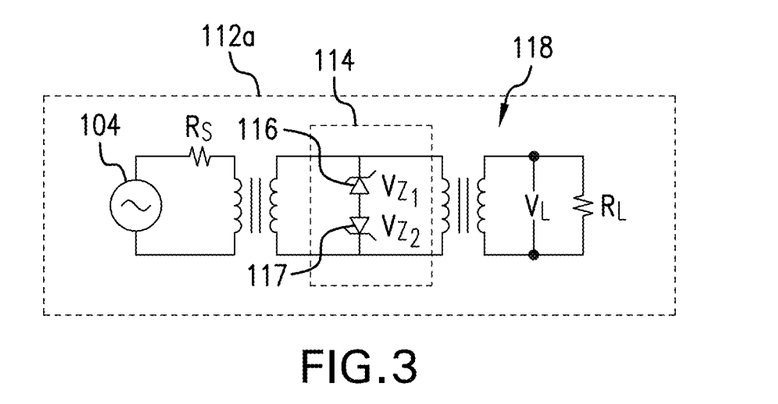
FIG. 3 is a schematic of one implementation of a limiter according to this disclosure.

Referring to FIG. 3, shown is threshold switch circuit implemented as a pair of Zener diodes, Zener diode 116 and Zener diode 117, which are shunt-connected in reverse polarity across the load. Each of Zener diode 116 and Zener diode 117 can represent one or more Zener diodes connected together in series to increase the voltage threshold of the device; for example, two Zener diodes series-connected and represented as Zener diode 116 or Zener diode 117 effectively sums the forward voltage of the second diode with the Zener threshold of the first diode. For microvolt-level receive signals, one to three simple signal diode junctions in series (0.6 volt nominal forward voltage per junction) are sufficient. As previously stated, Zener diodes are often used for higher voltage limiting applications, frequently several in series, and with two such opposed (reverse) polarity sets in series to achieve the needed bi-directionality for an RF signal.

In an embodiment where step-up circuit 112 steps up the voltage from source 104, it may be beneficial to step the voltage back down to the voltage level of the source (or some level in between) to maintain the impedance match of radio 10. In such instances, a transformer 118 is provided.

Transformer 118 can be a step-down transformer of a ration of N:1 where "N" is a design specification based on the voltage level of source 104. In such an implementation, the primary windings of transformer 118 are connected to step-up circuit 112. With specific reference to FIG. 3, step-up circuit 112 is connected in shunt across the primary windings of transformer 118. The secondary windings of transformer 118 can be connected to the load, for example, to receiver 106 to maintain the impedance match of radio 10.

In embodiments it may not be necessary to step-down the voltage. For driving certain receivers 106 implemented as amplifiers, such as a FET amplifier, the voltage and the impedance to the can be increased by step-up circuit 112 and the output of threshold switch circuit 114 can be applied to the amplifier (i.e. the gate of FET amplifier).

Figure 6:
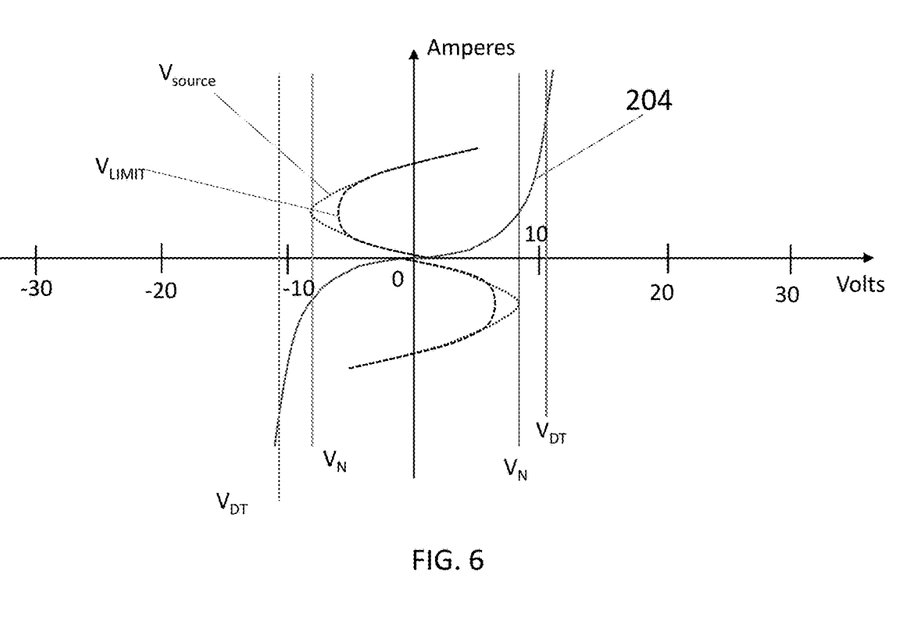
FIG. 6 shows an IV curve for a prior art radio.

FIG. 6 shows IV graph for an exemplary radio 10 where the IV curve of a threshold switch circuit is shown at line 204. Receiver 106 has damage threshold voltage ($V_{DT}$) of ±11V and the maximum normal voltage range ($V_N$) is ±8V. This means that as an input from source 104 (represented by $V_{SOURCE}$) exceeds the linear range of the threshold switch circuit, the output signal to receiver 106 will be limited (represented by $V_{LIMIT}$) to prevent output signal to receiver 106 from exceeding damage threshold voltage ($V_{DT}$) of ±11V. The output signal to receiver 106, however, will contain undesirable spectral artifacts. Diode limiter circuit 100, implemented in manners described, can increase the operating range of radio 10 without producing spectral artifacts in the output signal.

In an example, receiver 106 has damage threshold voltage ($V_{DT}$) of ±11V and the maximum normal voltage range ($V_N$) is ±8V. Step-up circuit 112 is implemented as a step-up transformer 12*a* with a winding ratio of 1:3 increases range of operation without similarly scaling the non-linear ranges of operation of threshold switch circuit 114.

Figure 7:
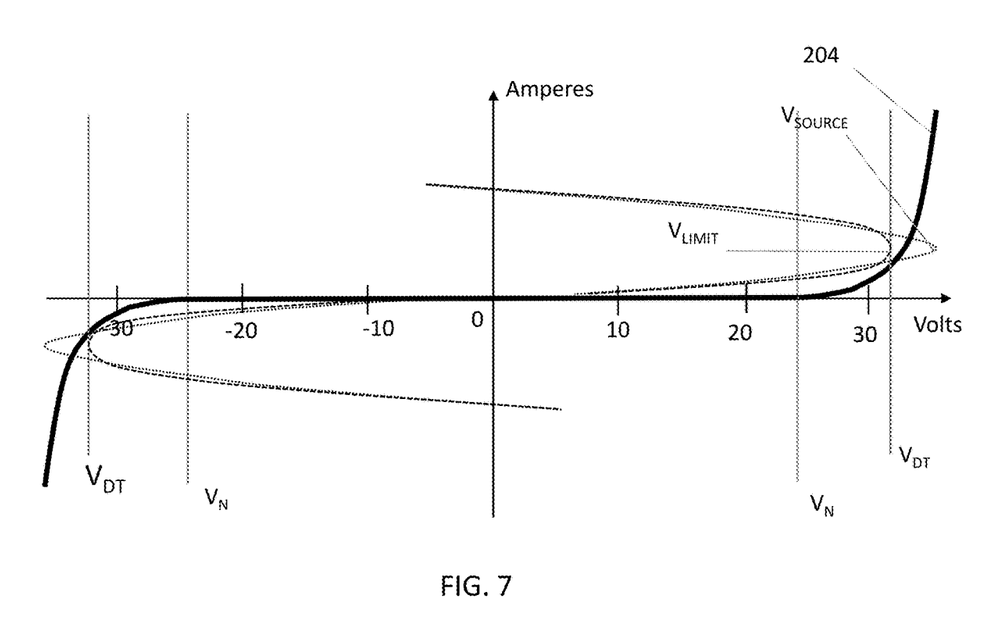
FIG. 7 shows IV curve for an exemplary radio according to this disclosure.

Referring to FIG. 7, shows IV graph for an exemplary radio 10 where the IV curve of a threshold switch circuit is shown at line 204 where transformer 12*a* with a winding ratio of 1:3 increases range of operation without similarly scaling the non-linear ranges of operation of threshold switch circuit 114. Threshold switch circuit 114 is implemented, as shown in FIG. 3, with Zener diode 116 and Zener diode 117 shunt-connected in reverse polarity across the secondary windings of transformer 12*a*. The knee-span of a single Zener diode is approximately 3V, but because the knee-span is summed for Zener diodes in series, with Zener diode 116 and Zener diode 117, the knee-span is approximately 6V at both the positive and negative limiting regions. However, a design constraint, referring back to FIG. 6, in this example allows for an allowable knee span of 3V $V_{DT}-V_N$.

By stepping up the voltage with transformer 12*a*, Zener diode 116 and Zener diode 117 shunt-connected in reverse polarity across the secondary windings of transformer 12*a* will have a maximum linear driving input of ±24V (3×±8V). The damage threshold ($V_{DT}$) is now ±33V. The ±6V non-linear, soft knee span (an area of graph represented from ±27V-±33V) is now above the maximum required driving signal $V_N$. Receiver 106 will never be driven nonlinearly and will never generate spectral artifacts. Zener diode 116 and Zener diode 117 can be connected in shunt across the primary windings of transformer 118 to step-down the voltage to restore it to the original voltage from source 104 (as limited by threshold switch 114).

Figure 4:
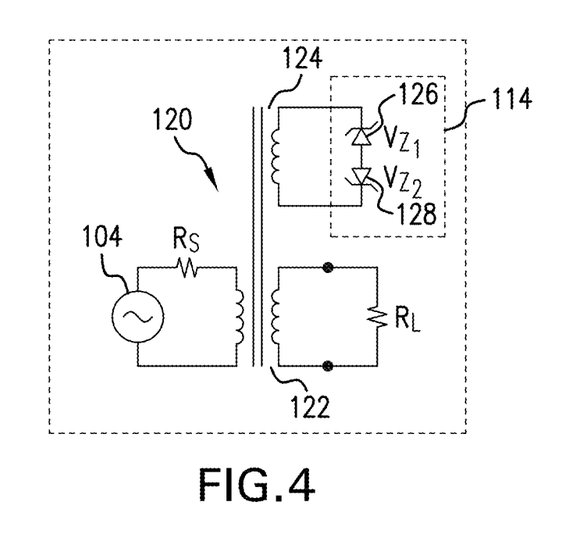
FIG. 4 is a schematic of another implementation of a limiter according to this disclosure.

An alternative embodiment is illustrated in FIG. 4, which shows source 104 connected to step-up circuit 112 implemented as a transformer 120 with a single core and two sets of secondary windings, which may also be known as an autotransformer. In this implementation, receiver 106 is connected to a first secondary winding 122 and step-up circuit 112 is connected to a second secondary winding 124 of transformer 120. Transformer 120 can be a 1:1 transformer with no voltage increase across from the primary winding to the first secondary winding 122 of transformer 120, which would also have a matched impedance with the load to maximize power transfer. The ratio of the windings between the primary winding and the second secondary winding 124 of transformer 120 can have a step-up (1:N) function such that when threshold switch circuit 114 switches to zero impedance it appears as a short across second secondary winding 124 so all of the energy induced in the core of transformer 120 is dissipated in the shorted second secondary winding 124. The windings can step up the voltage across one or both first secondary winding 122 and second secondary winding 124 (1:X:1, 1:1:X, or 1:X:X, 1:X:Y, or 1:Y:X).

Threshold switch circuit 114 is connected a second secondary winding 122 of transformer 120. In an implementation, threshold switch circuit 114 is implemented as a pair of Zener diodes, Zener diode 126 and Zener diode 128, which are shunt-connected in reverse polarity across second secondary winding 122. Each of Zener diode 126 and Zener diode 128 can represent one or more Zener diodes connected together in series to increase the voltage threshold of the device; for example, two Zener diodes series-connected and represented as Zener diode 126 and Zener diode 128 effectively sums the forward voltage of the second diode with the Zener threshold of the first diode. For microvolt-level receive signals, one to three simple signal diode junctions in series (0.6 volt nominal forward voltage per junction) are sufficient. As previously stated, Zener diodes are often used for higher voltage limiting applications, frequently several in series, and with two such opposed (reverse) polarity sets in series to achieve the needed bi-directionality for an RF signal.

Figure 8:
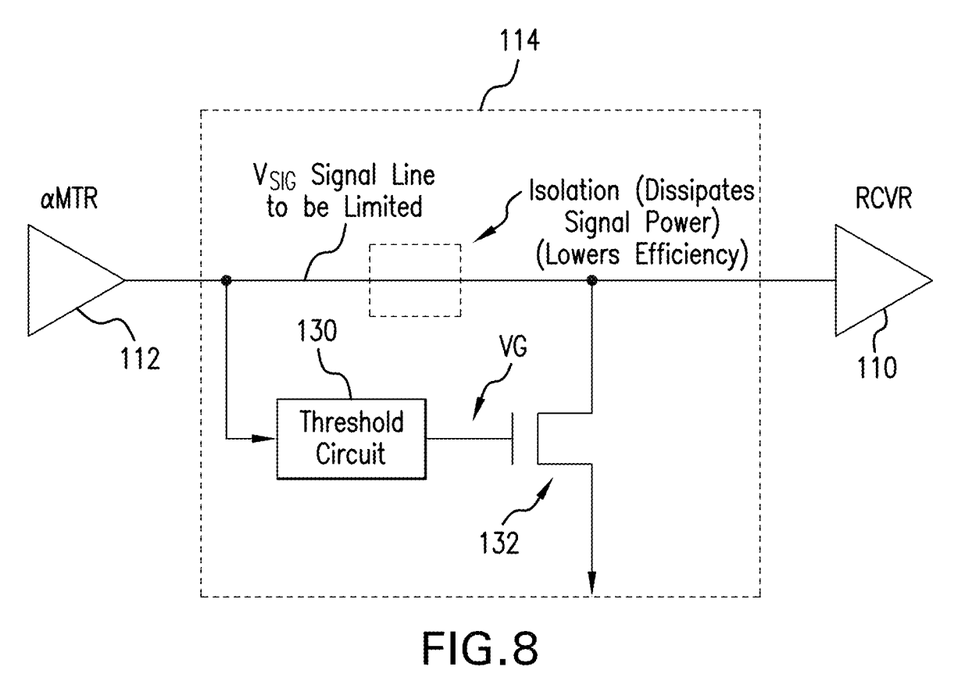
FIG. 8 is a schematic of another implementation of a limiter implemented as an active device according to this disclosure.

Limiter 100 can also be implemented as an active device. FIG. 8 shows limiter 100 implemented with at least one active device combined between step-up circuit 112 that steps up a signal received from source 104 and receiver 106. In such an implementation, threshold switch circuit 114 can be implemented as a transistor 132 or other gate-controlled device, such as a MOSFET transistor. In such an implementation, the source node of transistor 132 is grounded and the drain node of transistor 132 is attached to the stepped up signal from step-up circuit 112 being supplied to receiver 106. A sample of the signal can similarly be applied to the gate of transistor 132 through a level shifting circuit 130 so that whenever the gate voltage exceeds a preset threshold, the MOSFET switches from high impedance to low impedance. Similar to the IV graph for the diodes described above, the drain impedance versus the gate voltage is not an ideal right-angle response; rather it has a soft knee region similar to the diodes where it transitions from high impedance to low impedance. The transistor 132 also has a finite series resistance (RDSS in the case of a MOSFET). So the same principles apply, step-up circuit 112 steps up the voltage to extend the linear range and move the "knee" range of operation beyond the normal operating range.

The foregoing describes a simple, limiter 100 that is extremely linear at voltage values less than the threshold, and has a relatively hard limiting threshold. Step-up circuit 112 increases the threshold level (voltage or current) of receiver 106. As soon as an incoming signal begins to exceed the threshold level, threshold switch circuit 114 dissipates this excess energy before it can be received by receiver 106. Limiter 100 protects receiver 106 against damage due to large input signal excursions from source 104 that cause receiver 106 to attempt to produce an output beyond its design capabilities. Precise control of the peak driving signal is rarely possible, and in the case of receiver 106, nanoseconds-wide excessive signal peaks are sufficient to damage receiver 106 or any other down-stream devices. The disclosed limiter 100 has virtually no impact on the linearity of receiver 106 and hence spectral distortion products as long as power is constrained to remain below the limiting threshold.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A limiter comprising:
a step-up circuit with an input node and an output node for electrically stepping up an output signal at the output node from an input signal at the input node; and
a threshold switch circuit connected to the step-up circuit for limiting peak voltages of the output signal from the step-up circuit.

2. The limiter of claim 1, wherein the step-up circuit comprises of a first transformer that steps up the voltage of the output signal from the input signal at the input node of the transformer.

3. The limiter of claim 2, wherein the first transformer is a step-up transformer with a 1:N turn ratio for stepping up a voltage of the output signal with respect to the input signal an amount sufficient to increase a linear operating range of the threshold switch circuit.

4. The limiter of claim 2, and further comprising a second transformer connected to an output node of the threshold switch circuit to step down the voltage.

5. The limiter of claim 4, wherein the first transformer is a step-up transformer with a 1:N turn ratio for stepping up a voltage of the output signal with respect to the input signal an amount sufficient to increase a linear operating range of the threshold switch circuit applied to the output of the first transformer, and the second transformer is a step-down transformer with a N:1 turn ratio for stepping down the limited voltage of the output signal with respect to the input signal to maintain an impedance match to the receiving device.

6. The limiter of claim 1, wherein the threshold switch circuit comprises of a pair of cooperating, reverse polarity passive shunt switches for the limiting peak voltages of a positive and a negative cycle of the output signal from the step-up circuit.

7. The limiter of claim 6, wherein the pair of cooperating, reverse polarity passive switches comprise a Lair of Zener diodes series-connected in reverse polarity for the limiting peak voltages of a positive and a negative cycle of the output signal from the step-up circuit.

8. The limiter of claim 7, wherein each Zener diode of the pair of Zener diodes further comprises at least two Zener series-connected Zener diodes to increase a threshold voltage of the pair of Zener diodes.

9. The limiter of claim 8, wherein the pair of Zener diodes are connected in shunt across an output node of the step-up circuit.

10. The passive limiter of claim 9, wherein the pair of Zener diodes are connected in shunt across the output node of the first transformer.

11. The passive limiter of claim 10, and farther comprising a second transformer with the pair of Zener diodes connected in shunt across a primary winding of the second transformer and a load connected to a secondary winding of the second transformer.

12. The passive limiter of claim 11, wherein the first transformer is a step-up transformer with a 1:N turn ratio for stepping up a voltage of the output signal with respect to the input signal an amount sufficient to increase a linear operating range of the pair of Zener diodes and the second transformer is a step-down transformer with a N:1 turn ratio for stepping down the voltage of the output signal with respect to the input signal to maintain an impedance match to the receiving device.

13. The limiter of claim 10, wherein the first transformer further comprises a first secondary winding and a second secondary winding, wherein a load is connected across the first secondary winding and the pair of Zener diodes are connected in shunt across the second secondary winding of the first transformer.

14. The limiter of claim 10, wherein the threshold switch comprises of a transistor that is switched from a high impedance mode to a low impedance mode when a signal applied the transistor exceeds a threshold value.

15. The limiter of claim 1, wherein the step-up circuit and the threshold switch circuit are passive devices.

16. A method of protecting a receiver from an input signal from a source exceeding a damage threshold voltage for the receiver, the method comprising:
  increasing with a step-up circuit comprising an input node and an output node the input signal received at the input node of the step-up; and
  limiting peak voltages of the input signal from the output node of the step-up circuit using a threshold switch circuit connected to the step-up circuit.

17. The method of claim 16, and further comprising extending a linear range of operation of the threshold switch circuit by stepping up a voltage of the input signal from the source with the step-up circuit and dissipating excess energy from signals that exceed a threshold level with the threshold switch circuit.

18. The method of claim 17, wherein stepping up the voltage of the input signal from the source with the step-up circuit is done with a passive step-up circuit.

19. The method of claim 18, limiting the input signal from the source.

20. The method of claim 19, wherein limiting the input signal using a pair of cooperating, reverse polarity passive switches for the limiting peak voltages of a positive and a negative half-cycle of the input signal.

* * * * *